US010095426B2

(12) United States Patent
Brittner et al.

(10) Patent No.: US 10,095,426 B2
(45) Date of Patent: *Oct. 9, 2018

(54) ERROR TOLERANT OR STREAMING STORAGE DEVICE

(71) Applicants: Rod Brittner, Laguna Hills, CA (US); Ronald G. Benson, Boulder, CO (US)

(72) Inventors: Rod Brittner, Laguna Hills, CA (US); Ronald G. Benson, Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/743,797

(22) Filed: Jun. 18, 2015

(65) Prior Publication Data
US 2016/0139840 A1 May 19, 2016

Related U.S. Application Data

(63) Continuation of application No. 13/857,926, filed on Apr. 5, 2013, now abandoned, which is a continuation of application No. 12/450,888, filed as application No. PCT/US2008/003229 on Mar. 11, 2008, now Pat. No. 8,514,509.

(51) Int. Cl.
*G06F 3/06* (2006.01)
*G06F 11/10* (2006.01)

(52) U.S. Cl.
CPC ............ *G06F 3/0619* (2013.01); *G06F 3/064* (2013.01); *G06F 3/0673* (2013.01); *G06F 11/1016* (2013.01); *G06F 11/1068* (2013.01); *G06F 11/1076* (2013.01)

(58) Field of Classification Search
CPC .................................................. G06F 11/1008
USPC ......................................... 714/766, 768, 771
See application file for complete search history.

(56) References Cited

U.S. PATENT DOCUMENTS

| 6,912,585 B2* | 6/2005 | Taylor ................... G06F 3/0613 709/215 |
| 7,826,161 B2* | 11/2010 | Riedel ...................... G11B 5/02 360/48 |
| 8,249,350 B2* | 8/2012 | Voloshynovskyy ........................ G07D 7/0046 283/113 |

* cited by examiner

*Primary Examiner* — Fritz Alphonse
(74) *Attorney, Agent, or Firm* — Marsh Fischmann & Breyfogle LLP; Kent A. Fischmann

(57) ABSTRACT

A method of storing data includes receiving general purpose (GP) data and special Error Tolerant or Streaming (ETS) data, storing the GP data using a data storage method, and storing the ETS data using a different data storage method which affects the access rate, resilience to errors, data integrity, storage density, or storage capacity. The storage medium, which can include a disk drive, flash memory, or holographic memory, is utilized differently depending on the required Quality of Service in aspects including block size, storage of error correction codes, utilization of error correction codes, storage area density, physical format pattern, storage verification, or reaction to failed storage verification. For disk drives these differences include spacing between tracks; overlap between tracks; spiral track formatting; concentric track formatting, and size of blocks, and for flash memories these differences include levels per cell and number of cells.

27 Claims, 4 Drawing Sheets

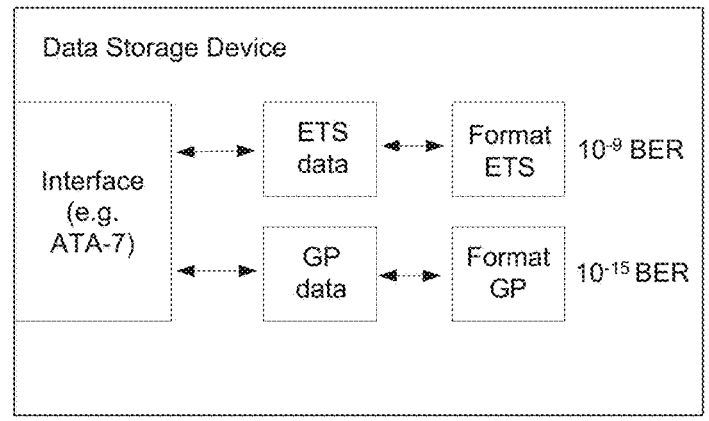
Fig. 1
| | Each LBA independently addressable | "file"-like cluster of LBAs pattern |
|---|---|---|
| Error intolerant | General Purpose (GP) | ETS data |
| Error tolerant | ETS data | ETS data |
Fig. 2
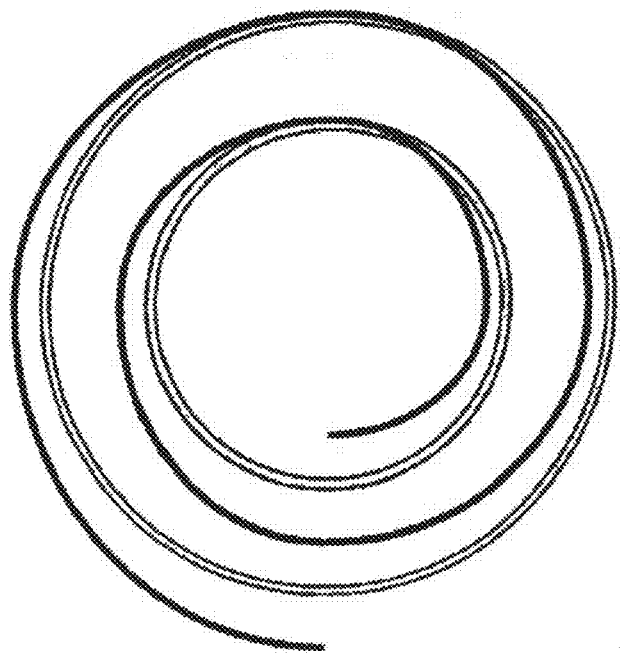
Fig. 3

ERROR TOLERANT OR STREAMING STORAGE DEVICE

CROSS REFERENCES

This application is a continuation of U.S. patent application Ser. No. 13/857,926, filed Apr. 5, 2013, entitled "ERROR TOLERANT OR STREAMING STORAGE DEVICE," which claims priority from co-pending U.S. patent application Ser. No. 12/450,088, filed Sep. 9, 2009, entitled "ERROR TOLERANT OR STREAMING STORAGE DEVICE," which is the U.S. National Stage of PCT Application US2008/003229, filed on Mar. 11, 2008, entitled "ERROR TOLERANT OR STREAMING STORAGE DEVICE," which claims the benefit of U.S. Provisional Application No. 60/894,201, filed on Mar. 10, 2007, and also claims the benefit of U.S. Provisional Application No. 60/951,398, filed on Jul. 23, 2007. The contents of all of the above-noted applications are incorporated herein by reference as if set forth in full and priority to these applications is claimed to the full extent allowable under U.S. law and regulations.

FIELD OF THE INVENTION

This invention is generally related to storage devices, and more particularly to storage devices for storing error tolerant or streaming data.

BACKGROUND OF THE INVENTION

This invention pertains to the application of a storage device (such as a disk drive, or flash memory, or holographic memory, or any type of data storage) and its use in storing and retrieving user data.

Generally, user data comprises both General Purpose (GP) data and data with special requirements, such as error tolerant or streaming (ETS) data. ETS data is either error tolerant, meaning that the data is still usable even with some errors, or streaming, meaning that each block of data follows the next in a "file"-like format, or both. As such, streaming Audio/Visual (AV) data would serve as an example of ETS data. Streaming AV data might come in the form of an MPEG-4 encoded TV program, for example. TV programs can be error tolerant, because the viewers will generally not mind small numbers of errors. Other error tolerant data could include communications between video game consoles, where players will generally not mind occasional errors. General Purpose data might be exemplified by such general system data as that which exists in a file allocation table or a general application file, where even a single-bit error can cause serious problems, and it is not always necessary to stream data at a high rate. GP data is typically reliant on data integrity, whereas ETS data may be more reliant on time of arrival. ETS data may be different than general purpose (GP) data in its relaxed bit error rate (BER) requirement or perhaps other unique aspects. The term BER as used herein refers to a system level "corrected" bit error rate.

ETS data may be more file-like than GP data. As an example of ETS data is an AV data stream. An AV stream can be a stream of HDTV signals for example, including Dolby AC-3 audio. Such AV data is an example of a data-rich, error tolerant stream of ETS data. Generally, an HDTV movie encoded with MPEG-4 AVC compression is expected to operate at a bit rate of 10-30 Mbps. The source may be prone to some errors and the target resilient to some errors as well. AV streams delivered over a network such as Data Over Cable (DOC) are specified by DOCSIS to have a BER of less than $10^{-8}$ bits per second. At 10 Mbps, this results in approximately 10 seconds between errors. Disk drives and flash memory systems are designed to provide an uncorrectable error rate of less than $10^{-14}$ to $10^{-15}$. Disk drives and flash memories are over designed for AV data storage by many orders of magnitude. A target system for an MPEG-4 data stream has built in resilience to some errors. Case studies have shown good MPEG-4 video display quality even when the network decoder delivers no better than $10^{-6}$-$10^{-7}$ post forward error correction (FEC) BER. ETS data allows the storage device to take advantage of certain unique features of the data to format its content at a higher density than GP data.

It is therefore an object of the invention to provide a data storage device with increased storage density for data which is error tolerant or streaming (ETS). It is another object of the invention to provide a method to better align the resources of a data storage device to the requirements of ETS data content. It is a further object of the invention to provide a method to increase the storage density and read throughput rate of ETS data in a storage device with respect to the prior art, and to deliver a corrected BER of better than $10^{-9}$ for full quality AV data.

SUMMARY OF THE INVENTION

A method of storing data includes receiving general purpose (GP) data and special Error Tolerant or Streaming (ETS) data, storing the GP data using a data storage method, and storing the ETS data using a different data storage method which affects the access rate, resilience to errors, data integrity, storage density, or storage capacity. The storage medium, which can include a disk drive, flash memory, or holographic memory, is utilized differently depending on the required Quality of Service in aspects including block size, storage of error correction codes, utilization of error correction codes, storage area density, physical format pattern, storage verification, or reaction to failed storage verification. For disk drives these differences include spacing between tracks; overlap between tracks; spiral track formatting; concentric track formatting, and size of blocks, and for flash memories these differences include levels per cell and number of cells.

BRIEF DESCRIPTION OF THE DRAWINGS

The invention is generally shown by way of reference to the accompanying drawings in which:

FIG. 1 depicts a Storage Device for General Purpose (GP) and Error-Tolerant-Streaming (ETS) data;

FIG. 2 depicts the attributes of ETS and GP data;

FIG. 3 depicts a spiral formatted AV data track, with a concentric circle format included for comparison;

DETAILED DESCRIPTION OF THE INVENTION

Figure 4:
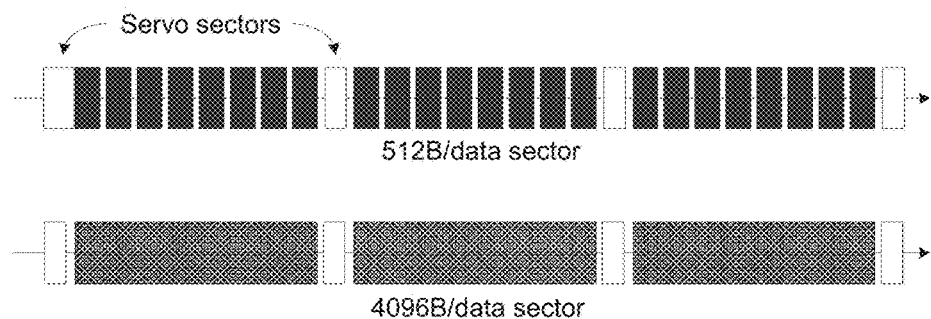
FIG. 4 depicts larger data blocks.

Some embodiments of the invention are described in detail with reference to the related drawings. Additional embodiments, features and advantages will become apparent from the ensuing description or may be learned by practicing the invention. In the figures, which are not drawn to scale, like numerals refer to like features throughout the description. The following description is not to be taken in a limiting sense, but is made merely for the purpose of describing the general principles of the invention. In the methods and steps which are described and claimed herein, the order in which steps are presented does not generally indicate an requirement for ordering in time unless an ordering of steps is inherent.

One embodiment of this invention presents a system and method to increase the storage density for a storage device for the application of error tolerant or streaming (ETS) data such as AV streams. ETS data, sometimes referred to herein simply as streaming data, can have one or more unique aspects compared to general purpose (GP) data, sometimes referred to herein simply as non-streaming data. Those aspects can be utilized by the storage device to improve the value of the device by storing and retrieving such ETS data at a higher density than the prior art.

In one embodiment of the invention, the storage device separates ETS data and GP data. As an example, the Streaming Command feature set of the ATA/ATAPI-7 specification allows a means for the device to delineate data types. ETS data is data which is sent to or from the storage device through the "AV Stream" channel of the ATA/ATAPI-7 protocol and can be differentiated from the GP data sent to or from the device via the standard ATA command protocol. In one embodiment of the invention, ETS data will be stored on the media in the storage device at a higher density than that which is typically be done in the prior art. In the case of a disk drive, the Areal Density (AD) of ETS data is higher than the AD of GP data. In the case of ATA/ATAPI-7 and a disk drive, the system requirements for AV data are generally different than those requirements of GP data in that the AV data is more tolerant of and prone to moderate errors. Storage devices such as disk drives and flash memory are typically designed to achieve the stringent uncorrectable error rate required by GP data—typically less than one error packet in $10^{14}$-$10^{15}$ bits transferred. ETS data is generally many orders of magnitude more tolerant to errors—one error in $10^9$ bits is considered "good" in terms of AV networks such as Data over Cable (DOC) and optical networks. The bit error rate (BER) of wireless networks is generally worse yet.

Also presented in an embodiment of the invention is a method to make use of a Quality of Service (QoS) feature such as what is presented in the configuration descriptors for the MPEG-4 codec protocol. An embodiment of the invention includes a dynamic means of assigning a corrected BER to the given QoS level for a set of ETS data. This better aligns the capability of the storage device to the dual nature of Consumer Electronics (CE) system data—storing ETS data at a higher density (thus improving the device's value add), while retaining the data integrity required by GP data. The data utilized in CE devices, while comprising both ETS and GP data types, tends to be dominated by ETS data such as AV stream content. Therefore, embodiments of this invention can present a significant storage capacity gain for a data storage device in a CE application where the data content is driven by ETS data such as AV data streams.

FIG. 1 depicts a Storage Device for General Purpose (GP) and Error-Tolerant-Streaming (ETS) data. FIG. 1 highlights how the device may separate ETS and GP data internally. FIG. 2 depicts the attributes of ETS and OP data. FIG. 2 highlights how ETS data can be different from GP data.

The notion of required service quality (such as the QoS parameter in various codecs) can be utilized to specify the actual required BER for a given data set. In some cases, the QoS may require only $10^{-6}$ BER (e.g. video encoded with MPEG-4). Where the required BER is relaxed by the QoS parameter, in one embodiment, the storage device may further increase the data storage density for ETS data associated with a lesser required QoS. Even with the increased storage density, system QoS is retained.

1) Physical Format

1A) Hard Disk Drive (HDD) Embodiment

For the case of a hard disk drive, one embodiment of this invention proposes several changes to the physical format of ETS data compared to that of OP data (note: sections a, b, c below can be used together or independently). These changes to an HDD storage device could increase the storage capacity for a given form factor. For example, an 80 GB, single disk 2.5" hard drive may jump in capacity to 120 GB or more of reliable AV data.

a) Bits per inch (BPI) and tracks per inch (TPI) will be increased so that the Areal Density (AD) of ETS data is higher than the AD of the prior art.
  BPI and TPI would be dependent on the Quality of Service (QoS) associated with that data set.
  ETS data with $10^{-6}$ BER requirement would have a higher AD than ETS data with $10^{-9}$ BER.
  BPI and TPI can be changed periodically by the device using steering data embedded in the data stream or stored external to the data stream (e.g. stored in a flash device on the HDD or stored on the host system). For example, this may be useful for variable BER requirements between MPEG-4 B-frames and I-frames.

b) Data tracks can be arranged in a continuous spiral pattern, as shown in FIG. 3. FIG. 3 depicts a spiral formatted AV data track, with a concentric circle format included for comparison.
  The spiral velocity (#servo tracks per revolution) would determine the user data TPI.
  In a conventional approach, user data is formatted as concentric circles. In one embodiment, this approach is used on a portion of a disk for GP data, where only some of the disk was formatted in a spiral. The disk can contain multiple concentric-formatted areas and spiral-formatted areas.

c) Physical blocks written to the storage media (the disk) can be of a larger size or utilize more efficient coding schemes than the prior art.
  FIG. 4 depicts larger data blocks. Larger blocks are more efficient at reducing inter-block gaps and also facilitate the use of such coding schemes as Low Density Parity Check (LDPC) codes, improved Reed Solomon or other Error Correcting Codes (ECC). In one embodiment, a conventional block size of 512 bytes is increased to 4,096 bytes per block for ETS data.

ECC can be arranged in row/column form to add error correction robustness.

1B) Flash Memory Embodiment

For the case of a flash memory device, one embodiment of this invention proposes to increase the storage density (Mbits/mm$^2$) over the prior art. Consider the flash areal density (Mbits/mm$^2$) as bits per area (BPA). This value comprises two factors—bits per cell (BPC) and cells per area (CPA).

bits/area=bits/cell*cells/area or,

BPA=BPC*CPA

Increasing BPA therefore, can be accomplished by increasing BPC or CPA or both.

Since ETS data is generally more tolerant to errors than GP data, a similar association with bit density can be made in flash memories as the aforementioned disk drive example. Additionally, using the QoS feature as described for a disk drive, the bits per cell can be dynamically modified per the given QoS for a given set of ETS data. One embodiment proposes the ability for the device to reduce its internal signal to noise ratio signal to noise ratio (SNR), thus allowing BPA to increase. Again, this can be accomplished with an increase in BPC or CPA or both.

Figure 5:
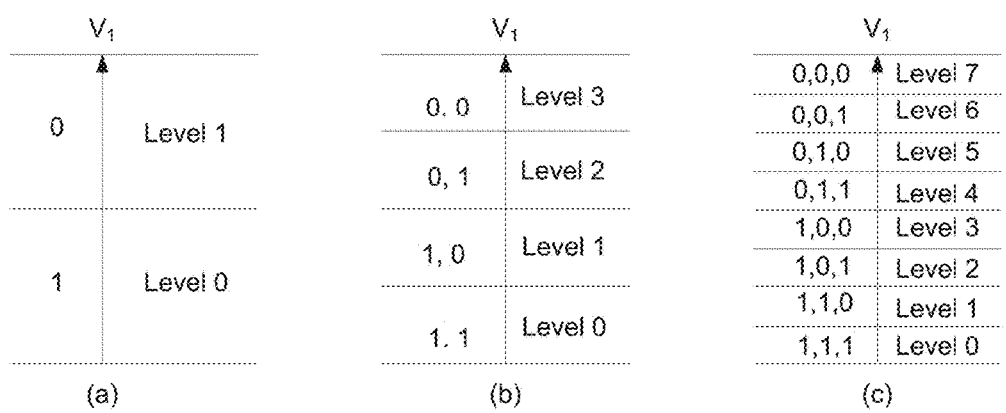
FIG. 5 depicts an example of how Vt levels are assigned to bits per cell.

As to BPC, generally, a flash device stores data by controlling the level of charge on a floating gate, which is part of a MOSFET transistor structure. The level of floating gate charge affects the Vt conduction threshold for each MOSFET cell. The cell stores data by its ability to uniquely program and then later measure a cell's Vt value. The number of levels of discernable Vt thresholds can be mapped into a bits/cell parameter (BPC). For example, a multi-level cell (MLC) device may assign 4 levels per cell to 2 bits per cell. Similarly, 8 levels may be assigned to 3 bits per cell. FIG. 5 depicts an example of how Vt levels are assigned to bits per cell. Part a) depicts 1-bit, b) depicts 2-bits, and c) depicts 3-bits per cell.

Figure 6:
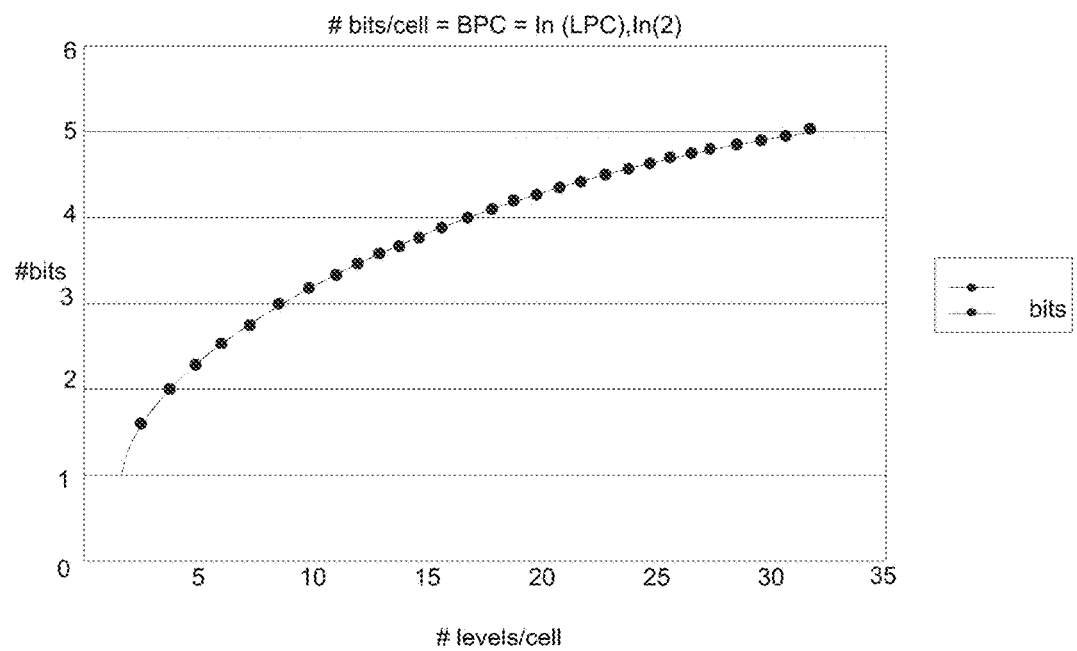
FIG. 6 depicts bits per cell (BPC) vs. levels per cell (LPC) in a flash memory device.

FIG. 6 depicts bits per cell (BPC) vs. levels per cell (LPC) in a flash memory device. Generally, the BPC follows a logarithmic relation to the number of LPC. Cells could be combined to form bit groupings if the BPC is not an integer value. For example, a choice of 6 LPC results in about 2.5 BPC. Four such 6-LPC cells could be mapped into a 10-bit cell grouping. An embodiment of this invention presents the opportunity to select the LPC dynamically to assign a higher LPC for ETS data than the LPC of the prior art. A higher LPC maps into a higher BPC (BPC=ln(LPC)/ln(2)), resulting in a higher BPA storage density for ETS data.

An embodiment proposes to increase flash memory storage density by allowing the device's internal SNR to degrade as BPC increases for ETS data, yet still retain the BER requirement for the ETS data.

In addition to increasing BPC, an embodiment of this invention presents the opportunity to increase the cell density for ETS data—cells per area (CPA). The flash manufacture chooses the CPA based on the process technology line width and the desired SNR required to resolve a cell's Vt value among the number of levels chosen for each cell. It has been shown above that this embodiment allows for the SNR lower limit to be reduced by allowing the LPC to increase. Similarly, this embodiment allows the SNR to degrade as CPA increases for ETS data.

One embodiment proposes that the device manufacturer can increase the CPA of a 1-bit cell (LPC=2) to the limit of the process technology line width, or until the Vt measurement SNR is degraded to the minimum level required for the desired corrected BER for GP data. Corrected BER refers to the BER achieved after all internal signal processing. For flash devices as with hard disk drives, this may include RS ECC and other error correction signal processing. From this point, an embodiment of the invention proposes a means to dynamically assign the LPC for ETS data depending on the desired QoS. For example, consider that 70 nm line width process technology allows for BPA of 30 Mbits/mm$^2$ using 1-bit cells (LPC=2). An embodiment of this invention proposes to increase the LPC to 3 or 4 (or more depending on QoS) resulting in a higher BPA density and degraded Vt measurement SNR for ETS data. The resulting QoS for the ETS data is retained. Thus, this embodiment proposes to increase the CPA or the BPC to achieve higher areal density for ETS data in a flash device.

By increasing the storage density for ETS data, one embodiment enables a flash memory device to store more ETS data in a given unit size of storage media. For example, an 8-Gbit device may be able to store 12-Obit or more with the same process and media area.

2) Streaming Mechanics

Figure 7:
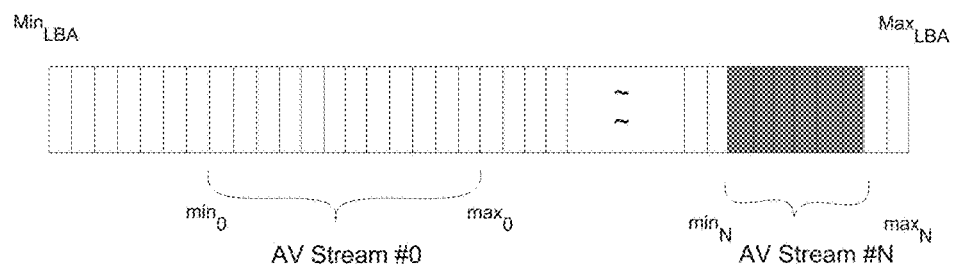
FIG. 7 depicts an example pattern of how an AV stream can be formatted logically as an arrangement or stream of contiguous LBAs.

ETS data also tends to be unique to GP data in that ETS data may be presented to the storage device in some sort of "file" format. FIG. 7 depicts an example pattern of how an AV stream can be formatted logically as an arrangement or stream of contiguous LBAs. The contiguous stream of such data serves as an example of how ETS data can have a "file"-like format.

GP data tends to be atomic down to the user block level. In the case of a disk drive, the user block in the prior art is 512 bytes. Each block is uniquely addressable in the interface protocol by a logical block address (LBA). ETS data may be arranged in a format, perhaps akin to what we can call a "file". Any sort of LBA grouping or other arrangement of LBAs would constitute a "file" structure in the case of a disk drive.

An embodiment of the invention proposes a method to utilize the file-like nature of ETS data to increase the storage capacity of the medium for such ETS data. For example, in the case of a disk drive and streaming AV data, the ETS data can be written to the media as a continuous stream of tightly packed physical blocks in the aforementioned spiral format. Further, an embodiment of this invention proposes the use of read-after-write to verify the just-written content of ETS data.

Figure 8:
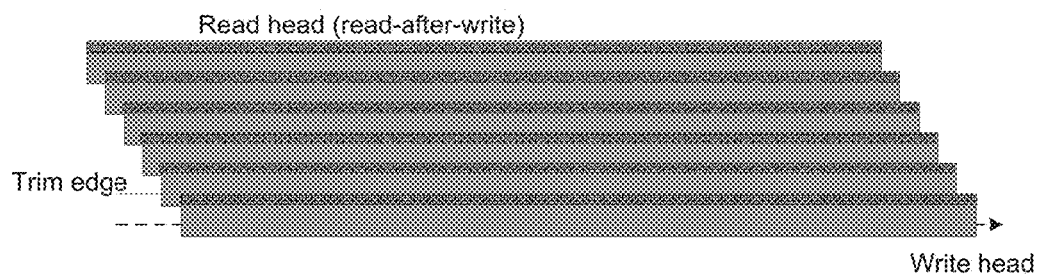
FIG. 8 depicts spiral writing and trimming, where each staggered box represents a data track.

In the case of a disk drive and streaming AV data, an embodiment of this invention allows the drive's servo system to forgo the customary seek TMR (track misregistration) spacing margin normally allotted for the track-to-track seek operation. Further, the disk drive can also write in the spiral fashion so as to "trim" each data track on only a single side and only for a single write instance. FIG. 8 depicts spiral writing and trimming, where each staggered box represents a data track. Once a given data block is written to the media, it can be checked with a read-after-write verification step to actually determine the readability of the final written state of each block.

In one embodiment, the storage device may use only a portion of its read error correction resources (ECC) to ascertain the "goodness" of the data. For example, if 20 bits of error-correction data were allocated for a certain portion of data, the read-after-write verification might detect an error in the data but then use only 10 of the error-correction bits in an attempt to correct the error. If the error can be corrected with only half the ECC bits, the data will be considered good enough so as not to require re-writing, while still leaving a margin of error in case there is further degradation to the data.

If the readability is suitable for the desired QoS, the data block is then kept and marked as such by the device's internal firmware system. If not suitably readable, then the block will be scheduled to be re-written at a convenient place and time in the current AV stream. Regardless of re-write, each data track is written only one time in a given stream. As such, the device need not allocate spacing margin for the case of multiple write instances to a given data track or data block location. See FIG. 8 for a linear perspective of how the tight spiral pattern promotes only single sided trimming and only one write instance for each data track. In one embodiment, the read-after-write step is performed on data which is in its final written state. That is, any neighboring data block whose write process may affect another block's goodness (e.g. encroachment or adjacent track erasure) is accounted for with this spiral read verify step since it is performed after all neighboring blocks have been written. In one embodiment, the blocks are written in the tight spiral format.

In the prior art for disk drive devices, some margin is left in the choices for BPI and TPI to retain full data integrity for multiple writes and for track-to-track seek TMR. Therefore, one embodiment of this invention allows the ETS data to be written to the media at a higher density, since the storage device has a-priori knowledge about the file-like ETS data which it has written in the aforementioned format and has checked by read-after-write.

Since in one embodiment for HDD, this invention proposes to write the user data in the form of tight spiral, we can also add dynamic steering information. Some examples of data that might be contained in the steering information are: information about TPI, BPI, block size, block format, etc. In one embodiment, this steering data would be written onto the media and contained within the ETS stream itself. For example, if the device chooses to dynamically change TPI, the device could place data packets within the stream to dynamically set the number of servo tracks per rev for the data TPI. If we assign 1.00 servo tracks per rev as the nominal TPI, then the TPI could change periodically to 1.01 servo tracks per rev to reduce the TPI by 1%. Similarly, 0.99 servo tracks per rev would increase the TPI by 1% over the nominal. An embodiment of this invention proposes the use of steering data to dynamically manage parameters in real-time so as to maximize the efficiency of ETS data formatting while retaining the desired QoS for a given ETS data stream.

It is also interesting to point out that an embodiment increases the read throughput rate over the prior art for the case of a disk drive. The limiting factors for read throughput in a disk drive are dominated by the BPI, track-to-track seek time, and RPM. In one embodiment and in the case of a disk drive, the present invention increases BPI, increases block size (which reduces inter-gap "dead" space), and completely removes track-to-track seek time. Therefore, one embodiment of this invention increases a disk drive's read throughput rate over the prior art.

An embodiment of this invention also offers an improvement of the prior disk drive art in the area of "flawscan". The term flawscan generally applies to the portion of a disk drive test process which the manufacturer typically utilizes to scan the entire surface of the drive's media, looking for and "mapping" for flaws in the media's ability to store user data. The reason for the flawscan process is driven by the fact that in the prior art, disk drives do not typically verify the written user data with a read-after-write step. Given the aforementioned proposal to use read-after-write, this embodiment offers a method for the device manufacturer to avoid this costly manufacturing step.

Further, some media defects are well known in the disk drive prior art to "grow" over time. Additionally, the disk drive prior art is troubled by what are called "high-fly-writes" (HFW). HFW describes a troublesome write of user data when the disk drive's write head is not within its allotted fly-height range for writing. This event can be caused by particulate contamination in between the head and the disk at the moment of writing. HFW and grown media defects are just two examples of problematic writes in the disk drive prior art which can cause read errors. An embodiment of this invention offers an inexpensive and reliable means to continually flawscan-on-the-fly for problematic writes of any cause within a ETS data set such as an AV stream.

An embodiment of the present invention also offers the ability to make real-time, on-the-fly decisions about the "goodness" of the written data by choosing to employ only a portion of the available error correction code (ECC) utilized in the data format. As such, the drive has a real-time means for measuring the goodness of the data during read verification while in the write process as previously described. Depending on the associated QoS, the device may choose to re-write only those sectors which fall below a particular "goodness" level. In this example, the term "goodness" may refer to the portion of the ECC system required to fully recover the user data without error. Generally, a data block's goodness would increase in proportion to a decrease in the amount of ECC required to fully correct the data. An embodiment of this invention therefore proposes a further increase in storage density for ETS data by allowing data sectors with reduced "goodness" to suitably satisfy the relaxed QoS of a given ETS data set.

3) Coding Opportunities

One embodiment of this invention makes use of the unique aspects of ETS data so as to improve the storage density in a data storage device. Larger blocks and LDPC coding can help improve coding efficiency and thus have a positive effect on BER. This approach can be expanded further for ETS data in the form of files or data streams.

If the storage device has knowledge that a given set of data blocks is a stream or a file, then the device can physically arrange the data to best meet its requirements. Larger data blocks have been presented as such a physical change. However, in actual implementation, one would expect some data blocks will be uncorrectable, even with the improved coding of LDPC or RS ECC. There are a number of reasons for dropped blocks—missed acquisition of timing synchronization is one such reason. With the aforementioned knowledge of the ETS data stream, the device can incorporate coding techniques to add resilience for such a dropped data block.

Figure 9:
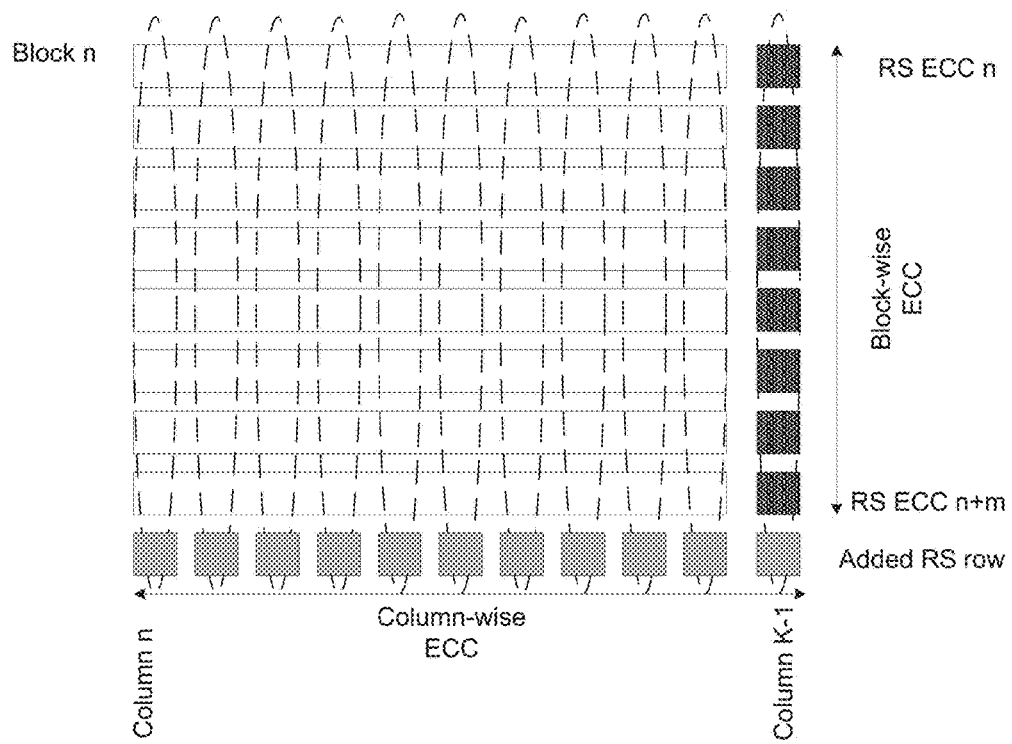
FIG. 9 depicts an ETS data stream transposed for columnated ECC data.

For example, the device can transpose the temporal arrangement of a data stream before adding its error correction code bytes such as RS ECC. FIG. 9 shows an example of how this temporal/spatial transposition may be done. FIG. 9 depicts an ETS data stream transposed for columnated ECC data. In this embodiment, m data blocks (e.g. LBAs) are arranged into m rows and columnized into K columns.

An additional row is added to create RS ECC data for each column. This approach is presented in an embodiment of the invention in the possible event that one of the data blocks are dropped or have enough error bits such that the "block-wise" ECC is incapable to fully correct the data. For this case, the "Column-wise" ECC can be utilized to help fully correct the data sequence.

One embodiment of this invention proposes the use of the fact that files or data streams can be arranged in the device into data block configurations and coding patterns which are suited to the ETS data requirements. With this embodiment, a previously uncorrectable block or portion of a block is now corrected using columnated ECC.

What is claimed is:

1. A method of storing data on a storage system comprising:
   providing a storage medium as part of the storage system;
   storing general purpose data on the storage medium using a first physical storage format attribute; and
   storing streaming data on the storage medium using a second physical storage format attribute different than said first physical storage format attribute;
   said first and second physical storage attributes being associated with differing storage qualities selected from the group consisting of: resilience to errors, data integrity, storage density, and storage capacity.

2. The method of claim 1 wherein the storage medium is utilized differently for general purpose data with respect to at least one of: block size, storage of error correction codes, utilization of error correction codes, storage area density, physical format pattern, storage verification, and reaction to failed storage verification.

3. The method of claim 1 wherein the block size for storing streaming data is larger than the block size for general purpose data.

4. The method of claim 3 further comprising:
   storing error correcting codes with the streaming data, the error correcting codes being of a type whose efficiency is facilitated by block sizes greater than 512 bytes;
   wherein the block size used for storing streaming data is greater than 512 bytes.

5. The method of claim 4 where the error correcting code is selected from the group consisting of: Reed Solomon and Low Density Parity Check.

6. The method of claim 1 further comprising:
   differentiating between general purpose data and streaming data sent to the storage device before the data is stored on the storage medium.

7. The method of claim 1 further comprising:
   determining, within the storage system, whether data received from a host is general purpose or streaming, by differentiating between streaming commands and non-streaming commands.

8. The method of claim 1 further comprising:
   determining, within the storage system, whether data received is general purpose or streaming, by examining addresses received from a host that indicate where the data is to be stored.

9. The method of claim 1 wherein the storage medium is selected from the group consisting of: hard disk drive platter, flash memory, and holographic memory.

10. The method of claim 1 wherein the storage density used to store streaming data is different from the storage density used to store general purpose data and the block size used to store streaming data is different from the block size used to store general purpose data.

11. The method of claim 1 wherein the storage medium is a hard disk drive platter, and the overlap of tracks is different for general purpose data than for streaming data, said overlap relating to an encroachment of an adjacent track onto a portion of an existing track.

12. The method of claim 1 wherein the storage medium is a hard disk drive platter, the general purpose data is stored on the hard disk drive platter in one or more concentric tracks, and the streaming data is stored on the hard disk drive platter in one or more spiral tracks.

13. The method of claim 1 wherein the storage medium is a hard disk drive platter, and streaming data is stored differently from the general purpose data in at least one physical aspect selected from the group consisting of: bits per inch and tracks per inch.

14. The method of claim 1 wherein the storage medium is a flash memory, and streaming data is stored with a different levels per cell than general purpose data.

15. The method of claim 1, wherein the storage medium is a flash memory, and streaming data is stored with a different number of bits per cell than general purpose data.

16. A method of storing data on a storage device comprising:
   1) providing a storage medium, the type of storage medium selected from the group consisting of: hard disk drive platter, flash memory, and holographic memory; and
   2) operating a data storage device for:
      a) inputting data to the storage medium;
      b) writing the data onto blocks of storage area on the storage medium;
      c) grouping the blocks of data to be stored into rows, the rows containing more blocks of storage area than are needed to store the data alone so that when data is not stored as intended, it is written in the extra blocks of data;
      d) reading back at least some of the data from the storage medium: and
      e) determining based on said reading back, whether the read back data is the same as the data intended to be written.

17. The method of claim 16 further comprising:
   storing the data a second time if the data was not stored as intended.

18. The method of claim 16 further comprising:
   storing the data onto a different storage area on the storage medium if the data was not stored as intended.

19. The method of claim 16 further comprising:
   storing the data again if the data was not stored as intended;
   reading back at least some of the data which has been stored again; and
   determining whether the data that is stored again has been stored as intended.

20. The method of claim 16 wherein:
   the step of reading data back at least some of the data from the storage medium is performed after the data is in a final state.

21. The method of claim 16 further comprising:
   storing error-correction data which supports error connection for multiple blocks of data.

22. The method of claim 16 further comprising:
   arranging the data blocks in rows; and
   storing, along with the rows of data, error-correcting data which supports error correction for the data in the corresponding row.

23. The method of claim 22 further comprising:
arranging the data blocks in columns; and
storing an additional row of error-correcting data, the contents of the blocks in the row of error-correcting data supporting error correction for the data in the corresponding columns.

24. The method of claim 16 further comprising:
writing error-correcting data onto the storage medium;
reading back at least a portion of the error-correcting data from the storage medium; and
using the error-correcting data to correct the information which was read back before a determination is made as to whether or not the data was stored as intended.

25. The method of claim 24 where only a subset of the error-correcting data is used to correct the information.

26. The method of claim 16 wherein said extra blocks of data are in the same row in which the data is grouped.

27. The method of claim 16 wherein said extra blocks of data are in a different row from the row in which the data is grouped.

* * * * *